United States Patent
Shlomot et al.

(10) Patent No.: US 7,080,010 B2
(45) Date of Patent: Jul. 18, 2006

(54) COMPLEXITY RESOURCE MANAGER FOR MULTI-CHANNEL SPEECH PROCESSING

(75) Inventors: Eyal Shlomot, Long Beach, CA (US); Huan-Yu Su, San Clemente, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 123 days.

(21) Appl. No.: 10/911,118

(22) Filed: Aug. 3, 2004

(65) Prior Publication Data

US 2005/0010405 A1    Jan. 13, 2005

Related U.S. Application Data

(63) Continuation of application No. 10/271,576, filed on Oct. 15, 2002, now Pat. No. 6,789,058.

(51) Int. Cl.
*G10L 19/02* (2006.01)

(52) U.S. Cl. ..................... 704/229; 704/201

(58) Field of Classification Search ............... 704/201, 704/229
See application file for complete search history.

(56) References Cited

U.S. PATENT DOCUMENTS

| | | | |
|---|---|---|---|
| 6,256,606 B1 | 7/2001 | Thyssen et al. | |
| 6,330,533 B1 * | 12/2001 | Su et al. | 704/220 |
| 6,353,807 B1 * | 3/2002 | Tsutsui et al. | 704/230 |
| 6,363,340 B1 * | 3/2002 | Sluijter et al. | 704/201 |
| 6,453,287 B1 * | 9/2002 | Unno et al. | 704/219 |
| 6,522,693 B1 | 2/2003 | Lu et al. | |
| 6,584,438 B1 | 6/2003 | Manjunath et al. | |
| 6,640,209 B1 | 10/2003 | Das | |
| 6,678,649 B1 | 1/2004 | Manjunath | |

\* cited by examiner

*Primary Examiner*—Vijay Chawan
*Assistant Examiner*—Michael N. Opsasnick
(74) *Attorney, Agent, or Firm*—Farjami & Farjami LLP

(57) ABSTRACT

A multi-channel speech processor for encoding speech in a packet network environment is disclosed. In one illustrative aspect, a complexity resource manager (CRM) is executed by a controller or processor. The CRM manages the level of complexity of encoding which is used by a signal processing unit (SPU) to convert the speech signal into packet data. In general, the CRM determines the level of complexity of encoding based on a calculated complexity budget, where the complexity budget is determined based on the time required to process prior speech signal channels and the time available to process the remaining channels. In this way, the CRM is able to control the overall complexity of the speech processor through its ability to signal the SPU to encode speech signal in a complexity reduced mode based on the calculated complexity budget under certain conditions.

12 Claims, 5 Drawing Sheets

COMPLEXITY RESOURCE MANAGER FOR MULTI-CHANNEL SPEECH PROCESSING

The present application is a Continuation of U.S. application Ser. No. 10/271,576, filed Oct. 15, 2002 now U.S. Pat. No. 6,789,058.

BACKGROUND OF THE INVENTION

1. Field of the Invention

The present invention relates generally to speech and audio signal processing. More particularly, the present invention relates to complexity resource management for multiple channel speech and audio signal processing.

2. Related Art

In recent years, packet-based networks, such as the Internet, have begun to replace traditional telephone networks (i.e., switched networks) for transportation of voice and data in accordance with voice-over-packet ("VoP"). The packetizing of voice signals for transmission over a packet network has been recognized as a less expensive, yet effective, alternative to traditional telephone service. For example, with the emergence of voice over IP ("VoIP"), telephone conversations may now be captured, packetized and transported over the Internet. Other examples of emerging VoP implementations include Next Generation Networks ("NGN"), which do not necessarily use the Internet Protocol (IP) for the transmission of packet voice.

In a conventional VoIP system, telephone conversations or analog voice may be transported over the local loop or the public switched telephone network ("PSTN") to the central office ("CO"), where speech is digitized according to an existing protocol, such as G.711. From the CO, the digitized speech is transported to a gateway device at the edge of the packet-based network. The gateway device receives the digital speech and packetizes it. The gateway device can combine G.711 samples into a packet, or use any other compressing scheme. Next, the packetized data is transmitted over the Internet using the Internet Protocol for reception by a remote gateway device and conversion back to analog voice in the reverse manner as described above.

For purposes of this application, the terms "speech coder" or "speech processor" will generally be used to describe the operation of a device that is capable of encoding speech for transmission over a packet-based network and/or decoding encoded speech received over the packet-based network. As noted above, the speech coder or speech processor may be implemented in a gateway device for conversion of speech samples into a packetized form that can be transmitted over a packet network and/or conversion of the packetized speech into speech samples. Ordinarily, a gateway processor handles the speech coding of multiple channels.

Efforts have been made to increase the efficiency and operation of speech processors to encode speech for transmission over packet-based networks. One area of development has been in the area of speech codecs. For example, recent speech codecs, such as the adaptive multi-rate (AMR), the enhanced variable rate speech coder (EVRC), and the selectable mode vocoder (SMV), have been designed for a best tradeoff between bit-rate, complexity and quality for their designed applications. In order to provider better playback quality at a lower bit-rate, these modern codecs are generally more complex and therefore require more processing power than lower-complexity high-bit-rate speech codecs, such as G.711. As a result of the increased complexity of these codecs and the associated hardware requirements, the channel density (i.e., number of channels) that a speech processor (or gateway) can support is limited. Increasing the processing power of speech processors and gateways to handle higher complex codecs would involve a substantial increase in cost and investment. On the other hand, operating lower-complexity high-bit-rate codecs results in increased bit rate and reduced throughput over the communication channels. In addition, in accordance with certain communication standards, low-bit-rate complex coders are mandatory, and therefore use of lower complexity codecs is not possible.

Speech encoding algorithms executed by speech processors (and gateways) have also been enhanced to increase the efficiency and operation of the communication channel. In particular, variable rate codecs were introduced for packet networks, where the average load on the networks is an essential factor in their operation. According to these enhanced encoding algorithms, the bit rate used to encode a speech signal may be selected according to the input speech. For example, approximately fifty percent (50%) of conversational speech involves inactive speech (silence). Typically, higher complex encoders are used to encode active speech segments with a somewhat higher bit rate, while lower complexity encoders are used to process silence or background noise (inactive speech) segments at a lower bit rate. Although this solution is suitable for the network due to its performance being related to the average bit rate, the processing of these multi-channels of speech by a DSP is particularly challenging, since the throughput of a DSP is not defined by the average complexity, but by the maximum complexity. Although, on the average, a DSP may be able to handle all the channels, since at a given time some channels carry active speech—that need higher complexity algorithm—and others carry inactive speech—that need lower complexity algorithm, there may still be instances where a majority or all channels involve active speech and, thus, all such channels needing higher complexity algorithm, which together will exceed the available computation power of the DSP.

Accordingly, there is a need in the art for a speech coder apparatus and method, which overcomes these and other shortcomings of present implementations for encoding voice information into a packetized form that can be transmitted over a packet network.

SUMMARY OF THE INVENTION

In accordance with the purposes of the present invention as broadly described herein, there is provided a multi-channel speech processor for encoding speech for a packet network environment. In one illustrative aspect of the present invention, a complexity resource manager (CRM) is executed by a controller or processor. The CRM manages the level of complexity of the coding, which is used by a signal-processing unit (SPU) to convert the speech signal into packet data. In some embodiments, the CRM may also be used to manage the decoding operation as well. In general, the CRM determines the level of complexity of the coding based on a calculated complexity budget, where the complexity budget is determined based on the time consumed to process prior speech signal channels and the time available to process the remaining channels. In this way, the CRM is able to control the overall complexity of the speech processor, and adjust the speech processor to meet the complexity budget, through its ability to signal the SPU to encode and/or decode a speech signal in a complexity reduced coding mode based on the calculated or consumed complexity budget.

For example, the speech processor may use the SMV codec to encode speech signals for a plurality of channels 1 through m. The SMV codec may provide four coding rates, each rate having an associated level of complexity including: a full rate, a half rate, a quarter rate, and an eighth rate, for example. It is possible that the SMV full rate, the quarter rate, and the eighth rate schemes are less complex than the SMV half rate scheme due to the more intense search required to execute the half rate scheme. In this example, the CRM may choose a coding rate for a given channel "n", based on the time spent processing channel 1 through n−1 and the available processing time left to process channels n through m. Thus, the CRM may select a lower level complexity rate (e.g., full rate, quarter rate, or eighth rate) to process a given speech signal channel n (or groups of channels "n+o", where "n+o"≦m) where the calculated processing time left to process the remaining channels would not be sufficient to support a higher level complexity coding rate (e.g., SMV half-rate). It is noted that although described in terms of ordinal numbers n for channels 1 through m, the speech processor of the present invention may actually process speech signals for channels 1 through m in any order as input signals arrives. It would also be readily apparent to one skilled in the art having the benefit of this disclosure that other speech codecs having coding rates of various complexity can also benefit from the CRM.

In accordance with other embodiments, the CRM is configured to signal the SPU to encode a speech signal based on a complexity level, rather than a specific rate. For example, the CRM may signal the SPU to switch to a higher or lower complexity algorithm, or to use a higher or lower complexity path in a particular algorithm, based on the complexity budget.

Typically the speech processor also executes a speech encoder algorithm for the common processing of channel speech signals, generally executed in conjunction with the CRM by the controller or implemented as a component of the CRM. As noted above, the encoder algorithm may be used to define the appropriate complexity coding rates corresponding to active speech segments and inactive speech segments, for example. When the CRM defines a lower complexity coding rate than the encoder algorithm in accordance with the complexity budget, the coding rate selected by the CRM overrides the rate selected by the encoder algorithm as is used by the SPU. Where the CRM does not define a coding rate (e.g., where the complexity budget would allow the remaining channels to be processed at the highest complexity rate) or where the complexity coding rate selected by the encoder algorithm is of less complexity than that defined by the CRM, the coding rate selected by the encoder algorithm is used by the SPU to process a given speech signal.

It is noted that the calculation of the overall complexity budget may also take into account the processing power consumed by other common processes (e.g., tone detection, echo cancellation).

In certain embodiments, the CRM may calculate the complexity budget based on groups of channels processed. For example, suppose the speech processor is capable of interfacing with sixty (60) communication channels. In this 60-channel example, the CRM may evaluate the complexity budget in four (4) groups of fifteen (15) channels, six (6) groups of (10) channels, or other various arrangement of groups of channels. Thus, the complexity budget may be calculated after the first 15 channels have been processed to determine the complexity rate for the next 15 channels. Likewise, the complexity budget may be calculated after the first 30 channels have been processed to determine the complexity rate for the next 15 channels, and so on.

According to another aspect of the present invention, the speech processor may be used to support a variable number of channels. In this embodiment, the CRM may determine whether an additional requested channel may be supported based on the calculated complexity budget and/or in accordance with certain quality requirements. For example, where the CRM determines that the available processing time left is sufficient to process all currently accepted or active channels and the requested channel, the CRM may accept the requested channel for processing by the SPU. Otherwise, if the available processing time left is not sufficient to process all currently accepted or active channels as well as the requested channel, the CRM denies the requested channel. In other embodiments, the CRM may be configured to accept the requested channel only if the quality of output of the active channels would not be severely impacted or fall below a certain threshold.

Variable channel support may be implemented in a number of ways. In some embodiments, a pre-determined number of channels are supported. In this embodiment, the CRM will accept a channel if the pre-determined number of channels have not been exceeded (i.e., the CRM is currently managing fewer than the pre-determined number of channels). Otherwise, the CRM will reject the requested channel. In other embodiments, acceptance of a requested channel involves first determining whether the SPU is able to run without any complexity reduction (e.g., up to N channels). If so, the CRM does not operate, and any requested channel can be accepted until N channels have been accepted. For each requested channel above N channels, the CRM performs statistical complexity reduction analysis. For example, the CRM may determine the level of complexity reduction needed to accommodate the requested channel, and may accept/reject the requested channel based on whether a certain threshold of complexity reduction will be exceeded.

According to yet another aspect of the present invention, the speech processor may support multiple codecs which are stored in a memory coupled to both the controller and the SPU. According to this embodiment, multiple speech codecs (e.g., AMR, EVRC, SMV, G.711) may be supported by the speech processor to provide wider support of speech coders. In operation, the controller loads the coder which corresponds to the input speech signal into the SPU for processing the speech signal while the CRM may define the level of complexity for the particular coder as described above.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, speech coding and decoding and the like. Such general techniques that may be known to those skilled in the art are not described in detail herein.

It should be appreciated that the particular implementations shown and described herein are merely exemplary and are not intended to limit the scope of the present invention in any way. For example, although the present invention is described utilizing the SMV speech coder, it should be noted that the present invention may be implemented with other speech coders having rates of various complexity. Indeed, for the sake of brevity, conventional data transmission, speech encoding, speech decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
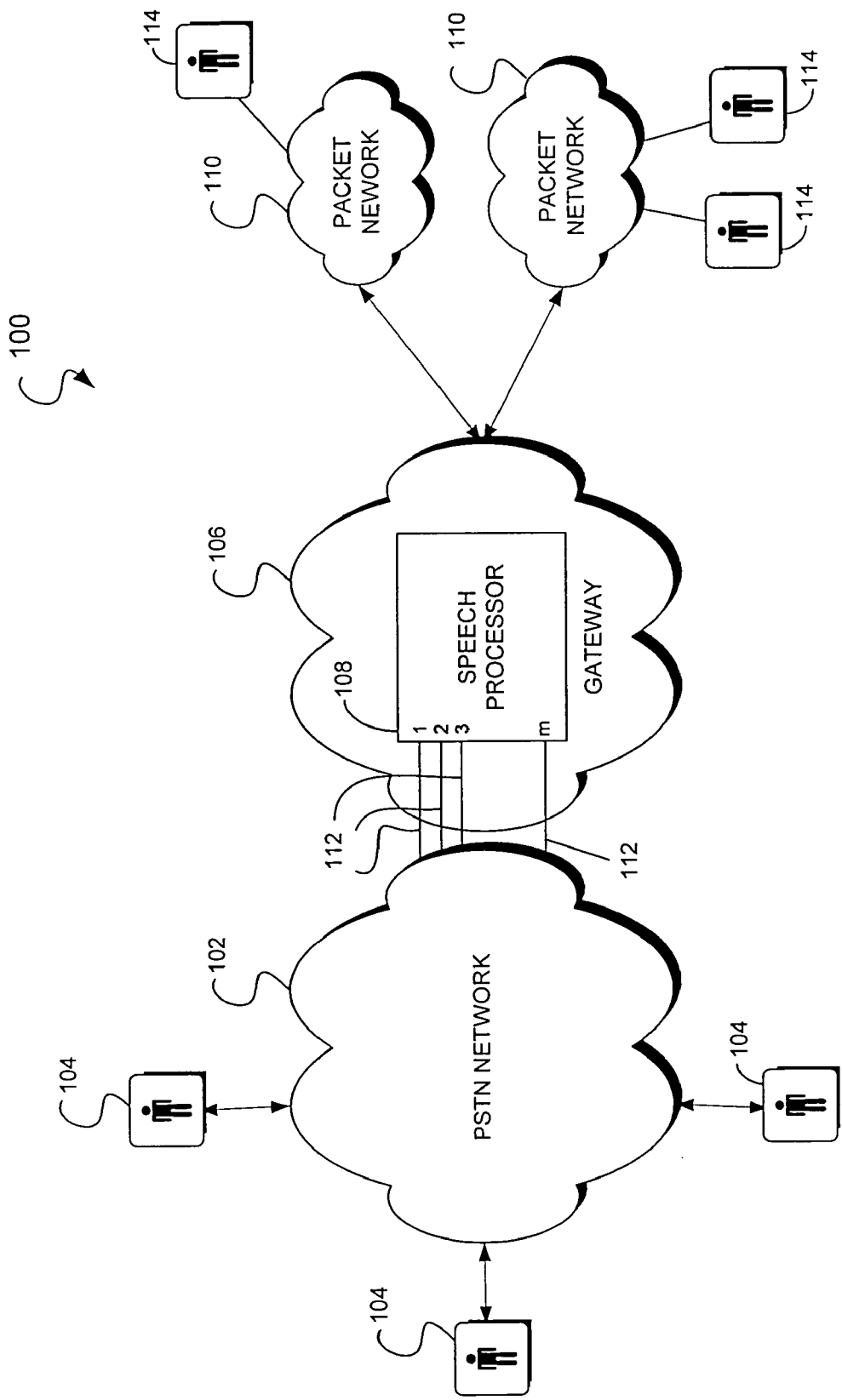
FIG. 1 illustrates a block diagram of a packet-based network in which various aspects of the present invention may be implemented.

FIG. 1 depicts an illustrative communication environment 100 that is capable of supporting the transmission of packetized voice information. Packet networks 110, such as those conforming to the Internet Protocol ("IP"), may support Internet telephony applications that enable a number of participants 104, 114 to conduct voice communication in accordance with VoP techniques. Network 102, which may be a non-packet network, such as switched network, or PSTN, supports telephone conversations between participants 104. In a practical environment 100, network 102 may communicate with conventional telephone networks, local area networks, wide area networks, public branch exchanges, and/or home networks in a manner that enables participation by users that may have different communication devices and different communication service providers. In addition, in FIG. 1, participants 104 of switched network 102 may communicate with other participants 114 of other packet networks 110 via gateway 106.

Speech processor 108 of gateway 106 converts conventional voice information of participants 104 of network 102 into a packetized form that can be transmitted to the other packet networks 110. A gateway is a system which may be placed at the edge of the network in a central office or local switch (e.g., one associated with a public branch exchange), or the like. It is noted that in addition to the speech encoding and decoding, the gateway performs various functions of receiving and transmitting information (speech samples) from the switched network 102, and receiving and transmitting information (speech packets) from the packet network (e.g., padding and stripping header information). The gateway also performs data (modem, fax) transmission and receiving functionalities. It will be appreciated that the present invention can be implemented in conjunction with a variety of gateway designs. A corresponding gateway and a speech processor (not shown) might also be associated with each of the other networks 110, and their operation is substantially the same manner as described herein for gateway 106 and speech processor 108 for encoding speech information into packet data for transmission to other packet networks. It is also possible that participants 114 generate packetized speech, where no gateway or additional speech processing is needed for the communication of participants 114 to the networks 110.

Speech processor 108 of the present invention is capable of interfacing with a plurality of communication channels (e.g., 1 through m channels) via communication lines 112 for receiving speech signals as well as control signals in network 102. For example, speech signals from participants 104 are communicated via an appropriate channel for processing by speech processor 106 as described in further detail below. The output of speech processor 108 is then communicated by gateway 106 to the appropriate destination packet network.

Figure 2:
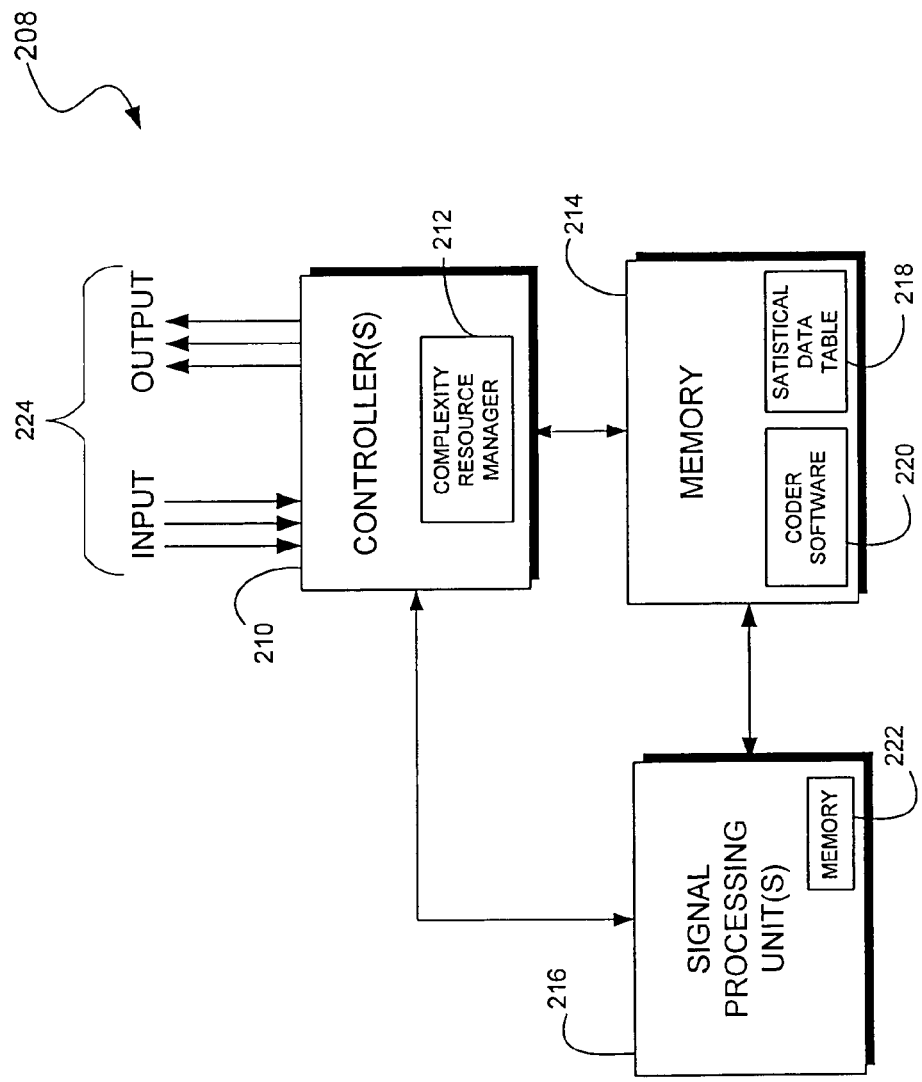
FIG. 2 illustrates a block diagram of a multi-channel speech processor in accordance with one embodiment.

Referring now to FIG. 2, a block diagram of an illustrative multi-channel speech processor 208, in accordance with one embodiment of the present invention, is shown. Speech processor 208 corresponds to speech processor 108 of FIG. 1, and comprises at least one controller 210 executing a complexity resource manager (CRM) 212. The controller 210 is coupled for communication to a memory 214 and one or more signal processing units (SPU) 216 and receives and transmits information via a plurality of input/output channels 224 to other systems or devices.

Controller 210 comprises a processor, such an ARM® microprocessor, for example. In certain embodiments, a plurality of controllers 210 may be used to enhance the speech processor's 208 performance or to provide greater channel density. Similarly, a plurality of SPUs 216 may be used to provide increased performance and/or channel density of speech processor 208.

Memory 214 stores information accessed by controller 210 and SPU 216. In particular, memory 214 stores speech signal process time values in a statistical data table 218 or other database format which is used to calculate a complexity budget by CRM 212 as described more fully below. For example, the statistical data table 218 may record the speech signal process time spent by speech processor 208 to encode the speech frames on each communication channel. In this way, CRM 212 is able to determine the remaining process time available to process the remaining channels (i.e., the remaining complexity budget). An illustration for carrying out this calculation is described more fully below. Memory 214 also stores speech signal data which is processed by SPU 216 as well as the packetized speech data after conversion by SPU 216.

It is noted that the arrangement of speech processor 200, as depicted in FIG. 2, is only illustrative and other arrangement for carrying out the operations of CRM 212 are suitable for use with present invention. For example, a clock of controller 210 may be used to measure the true execution time. In that case, all of the timing information will be produced by controller 210, and not shared in memory 214 with SPU 216. In other embodiments, the operations of CRM 212 may be carried out completely in SPU 216. In yet other arrangements, the operations of CRM 212 may be distributed between controller 210 and SPU 216.

SPU 216 carries out the operation of converting a given frame of speech signal data from an input channel 224 into a packetized format using one of the coding rates of a speech codec 220. For example, the SPU 216 may use one of the four SMV coding rates (e.g., full rate, half rate, quarter rate, and eighth rate) to convert a speech signal frame received via input channels 224. The determination as to which coding rate the SPU 216 uses for this encoding process is carried out by CRM 212 in accordance with the present invention and, if desired, in conjunction with other speech encoder algorithms.

CRM 212 typically comprises software, which is executed by controller 210 to control the overall multi-channel processing complexity of speech processor 208 by signaling SPU 216 to perform its encoding operation in a complexity-reduced mode (i.e., use a less complex coding rate or a less complex version of one or more blocks of the coding scheme) based on the calculated complexity budget under certain conditions. This scheme allows CRM 212 to sacrifice the average bit rate and/or quality of certain channels per cycle, when required, to satisfy the complexity budget, thereby providing greater channel density under certain conditions. Such conditions may include situations where a high number of channels are carrying active speech. However, this temporary decrease in quality for most speech codecs is not normally detectable by the user, partly because bursts of high number of channels at active condition are only transitory, and partly because the order in which channels are processed by SPU 216 may not necessarily sequential, and therefore the same channel may not necessarily be sacrificed over extended periods or over consecutive processing cycles. In some embodiments, channels may be processed sequentially, but in other embodiments channels may be processed randomly. In the case of SMV, the full rate coder, which might be less complex than the half rate coder (i.e., requires less processing time), is of better quality than the half rate. In this case, the use of the less complex full rate for the reduction of the complexity would not result in a reduction of quality, and the only impact on the system would be a slight increase in the average bit rate. Since the transient increase of the average bit rate has only minimal impact on the performance of the communication channels implemented in the packet networks 110 of FIG. 1, this increase will not be felt by the end user and will not have a significant impact on the system performance. As a result, a higher channel density may be facilitated by the speech processor 208 of the present invention with little or no appreciable quality loss from a user's perspective.

In conjunction with CRM 212, controller 210 may also execute other speech processing algorithms to further enhance the speech encoding performance. These other speech encoding algorithms may be implemented in conjunction with CRM 212 or integrated directly within CRM 212. For example, higher complexity encoders may be selected to encode active speech segments, while lower complexity encoders may be used to process silence or background noise (inactive speech) segments to efficiently allocate processing power. However, also as noted above, there may be instances where a majority or all channels involve active speech. Normally, speech encoder algorithms would select higher complexity coding rates to encode the signals associated with the active speech channels. Yet, in accordance with the present invention, CRM 212 may define a lower complexity rate than the encoder algorithm in accordance with the complexity budget. When this occurs, the coding rate selected by CRM 212 overrides the coding rate selected by the encoder algorithm. When CRM 212 does not define a coding rate (e.g., where the complexity budget would allow the remaining channels to be processed at the highest complexity coding rate) or where the coding rate selected by the encoder algorithm is of less complexity than the coding rate defined by CRM 212 (e.g., where the speech signal is an inactive speech segment), the coding rate selected by the encoder algorithm is used by SPU 216 to process a given speech signal. However, when CRM 212 does define a coding rate (e.g., where the complexity budget would not allow the remaining channels to be processed at the highest complexity coding rate), the lower coding rate selected by CRM 212 overrides the coding rate selected by the encoder algorithm to process a given speech signal.

Figures 1, 3:
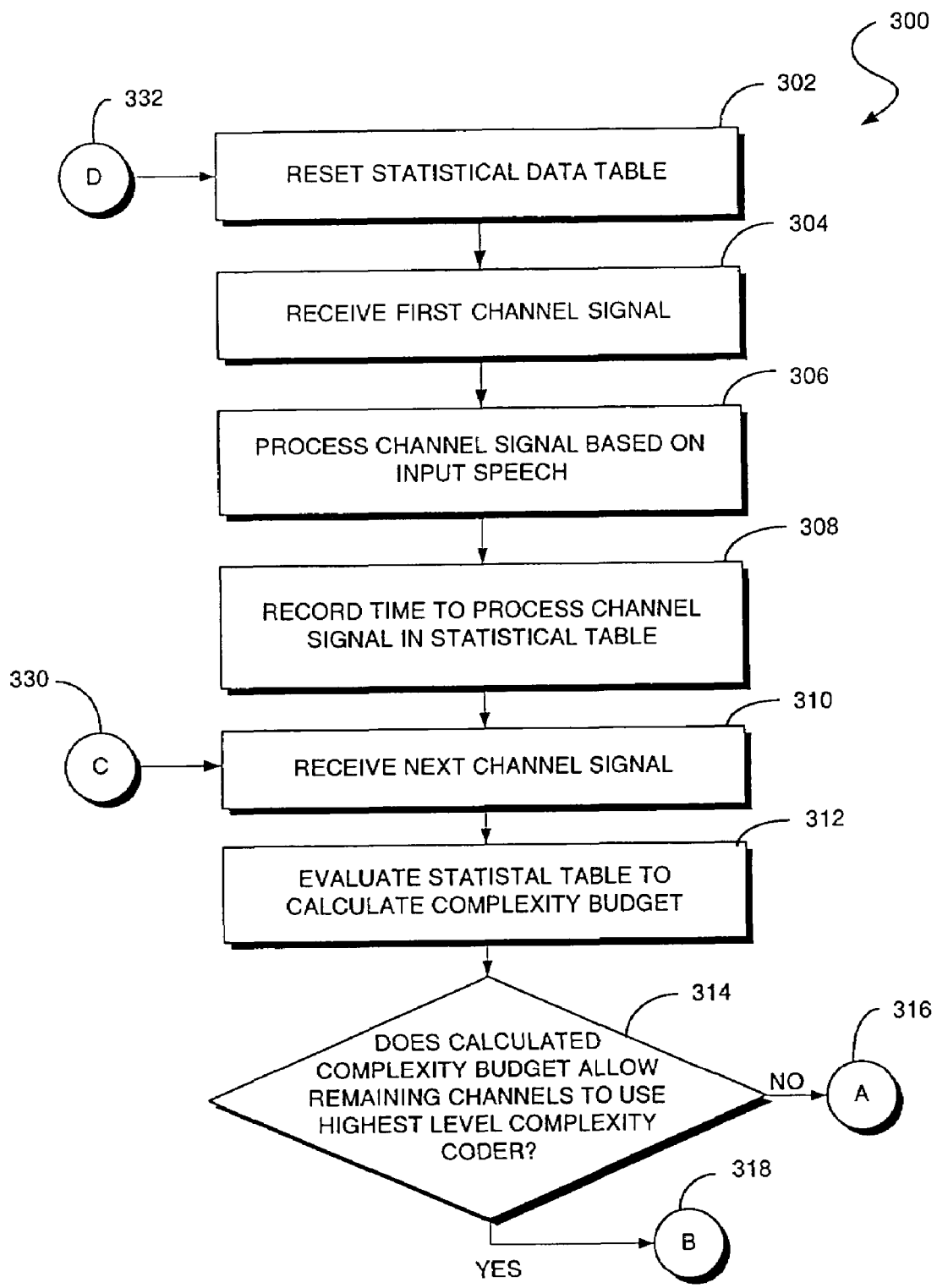
FIG. 3 depicts an illustrative flow diagram of a speech encoding method utilizing a complexity resource manager in accordance with one embodiment.
Figures 2, 3:
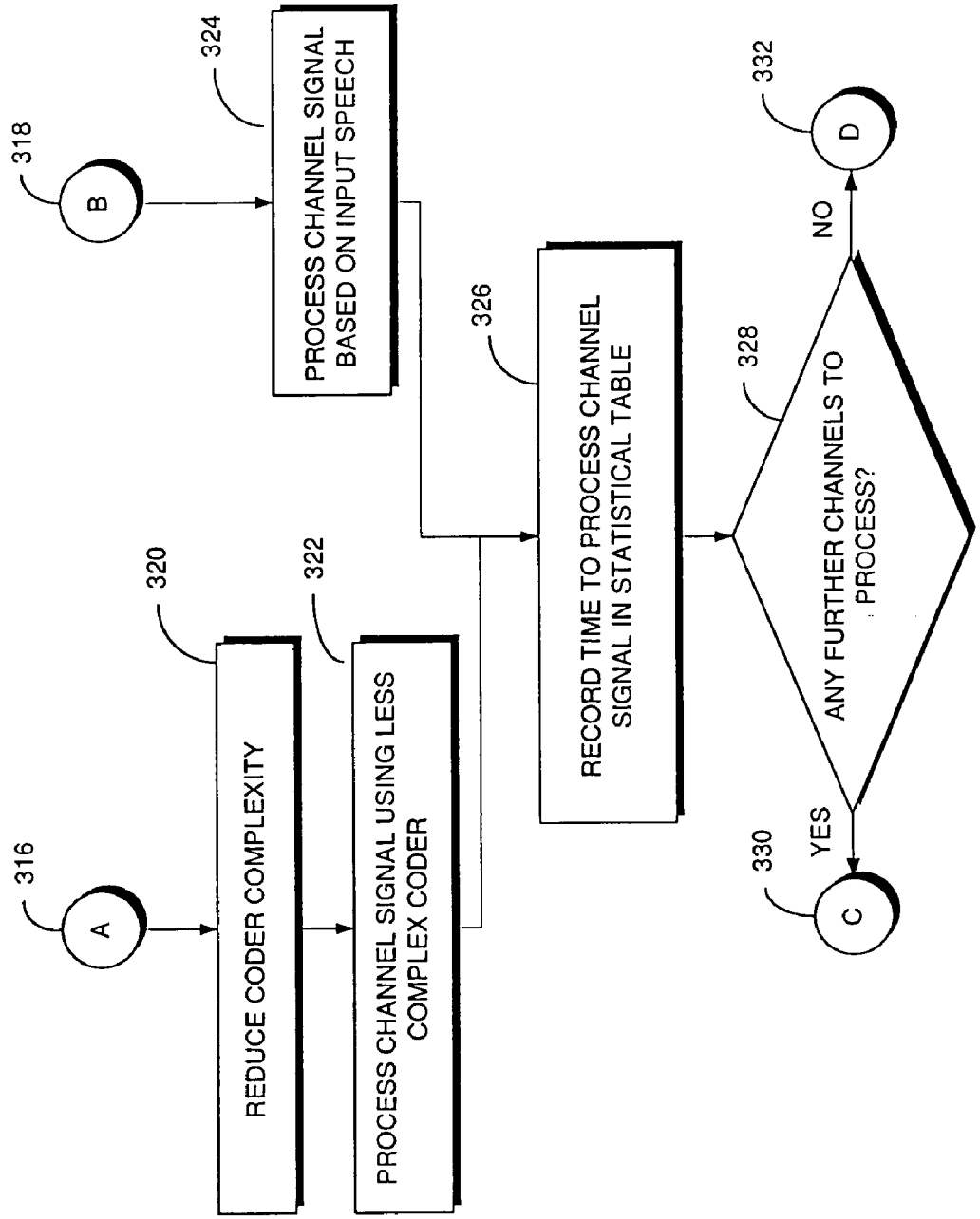

Referring next to FIG. 3, there is shown an illustrative flow diagram of a speech encoding method utilizing CRM 212 in accordance with one embodiment of the present invention. To illustrate this process, reference will be made to an example speech processor 208 having four (4) SPUs 216. In this example, speech processor 208 is configured to support sixty (60) communication channels (each SPU 216 processing fifteen (15) channels). To further assist in illustrating the management process of the present invention, the following exemplary specifications are also provided: a processing power of 300 MIPS per frame cycle will be defined for each SPU 216; the exemplary four rates of the SMV codec will be referenced (full rate, half rate, quarter rate, or eighth rate); and Table 1 defines exemplary peak complexity values associated with the SMV coding rates.

TABLE 1

| Rate | Processing Power |
| --- | --- |
| Full rate | 15 MIPS |
| Half rate | 25 MIPS |
| Quarter rate | 10 MIPS |
| Eighth rate | 5 MIPS |

As noted above, the SMV half rate is the rate of highest complexity (25 MIPS (million instructions per second)) due to the complex searches used during encoding a half rate packet. In other implementations, rather than complexity rates, "complexity blocks" having associated levels of complexity may be used and selected by CRM 212 for selecting the level of encoding by SPUs 216. The complexity blocks define a complexity level of encoding to be used by SPU 216.

Referring now FIG. 3, as well as FIGS. 1 and 2, process 300 is carried out by speech processor 208 every frame cycle (e.g., every 20 ms) to process speech signals from packet network 102. In the present example, the speech signal frame segments from the 60 channels are processed by the 4 SPUs 216, each SPU 216 processing 15 speech signal frame segments. The following discussion relates to the process carried out by one of the SPU 216, although a similar process is carried out by the remaining SPUs.

First at block 302, the speech signal time values stored in statistical data table 218 are reset. This reset occurs during startup and at the beginning of each frame cycle. Next at block 304, the speech signal frame segment for the first channel is received. As noted above, the actual order in which channels are processed may not be defined in any particular sequence; thus, "first channel" relates to the channel which is processed first, rather than the channel in the first position. At this point, there is no historical speech signal time values stored in statistical data table 218; and therefore, the speech signal frame segment is passed to SPU 216 for processing (normally from memory 214).

At block 306, the speech signal frame segment from block 304 is processed by SPU 216, based on the input speech. As described above, one or more speech encoder algorithms may be used to define the coding rate used to encode the input speech (e.g., based on active or inactive speech).

At block 308, the time spent processing the speech signal frame segment during block 306 is recorded or otherwise stored in statistical data table 218. This time value represents the process time consumed during the encoding operation of block 306 ("speech signal process time value"). Using the example values from Table 1, if the full rate encoding scheme was used, about 15 MIPS might have been consumed; if the half rate encoding scheme was used, about 25 MIPS might have been consumed; and so on. It is noted that the time recorded can be either true time measurements, obtained by the system clock, or pre-tabulated values. The pre-tabulated values might be, for example, pre-measured maximum execution time for each rate.

At block 310, the next channel speech signal frame is then received for processing. Next at block 312, CRM 212 evaluates statistical data table 218 and calculates a complexity budget. As described above, this calculation can be made at certain intervals (or groupings). Since each SPU 216 processes fifteen (15) speech frame in this example, this evaluation/calculation can be made after five (5) channels have been processed, and again after ten (10) channels have been processed (where the 15 channels are grouped into three groups of five channels). It is noted that other grouping and combinations may be used. In certain embodiments, the evaluation/calculation can be made in accordance with a dynamic or intelligent scheme, rather than at fixed intervals. In yet other embodiments, the evaluation/calculation can be made any time after the first channel has been processed.

One way to determine the remaining complexity budget would be to subtract the consumed process time from the available process time. By way of example, suppose the first five (5) channels were processed using the SMV half rate. In this case, statistical data table 218 might indicate that 125 MIPS have been consumed (5 channels, each consuming 25 MIPS for the half rate). Accordingly, CRM 212 would calculate that the remaining complexity budget to be 175 MIPS (125 MIPS consumed from the 300 MIPS of processing power).

At decision block 314, CRM 212 then determines the complexity coding rate at which the remaining channels can be processed based on the calculated complexity budget from block 312. For example, CRM 212 may determine the "highest" complexity coding rate at which the remaining channels can be processed. If the highest complexity coding rate is suitable for use based on the complexity budget, processing continues to block 324 as indicated by connection "B" 318. If not, CRM 212 may evaluate whether the next "highest" complexity coder is suitable; and so on. Where CRM 212 determines a reduced coding is appropriate for use based on the complexity budget, processing continues to block 320 as indicated by connection "A" 316.

Using the exemplary values discussed above in conjunction with block 212, CRM 212 has determined that after processing five (5) channels, the remaining complexity budget is 175 MIPS. Since there are ten (10) channels left to process, CRM 212 then determines that the remaining ten (10) channels may not be processed with the highest complexity coding rate (e.g., the SMV half rate), since the amount of processing time to process the remaining 10 channels at the half rate would require 250 MIPS (ten channels at 25 MIPS). However, the next highest complexity coding rate (i.e., the full rate) is suitable for use, since, at most, the amount of processing time to process the remaining ten channels at the full rate would require 150 MIPS (ten channels at 15 MIPS). CRM 212 may alternatively determine that one of the other lower complexity rates (quarter rate and eighth rate) may be used (e.g., to compensate for the bit rate usage). For example, a "complexity-reduced" SMV half-rate having an approximate processing complexity of 17 MIPS may alternatively be used instead of the SMV full-rate. This complexity-reduced SMV half-rate would be suitable for use in the above example since, at most, the amount of processing time to process the remaining ten channels would require 170 MIPS (ten channels at 17 MIPS) where the remaining complexity budget is 175 MIPS.

Now suppose that the first five (5) channels were processed at the half rate and the next five (5) channels were processed at the full rate. In this case, the statistical data table 218 would indicate that 200 MIPS have been consumed (the first five (5) channels consuming 125 MIPS at the half rate, and the next five (5) channels consuming 75 MIPS at the full rate). Thus, CRM 212 would calculate that the remaining complexity budget to be 100 MIPS (200 MIPS consumed from the 300 MIPS). With 100 MIPS remaining, there would not be sufficient processing time to process the remaining five (5) channels at the half rate, since 125 MIPS would be needed at the half-rate. CRM 212 may then reduce the complexity coding rate for the some or all of the remaining channels in order to comply with the complexity budget as described above. As can be seen from this example, even though the highest complexity rate (half rate) was not available for use with all the channels, processing power was made available for all fifteen (15) channels for a given SPU (and thus support for all sixty (60) channels considering the four SPUs 212).

At block 324, the speech signal frame segment is processed in an "unconstrained" manner. That is, CRM 212 does not provide an overriding complexity coding rate to use since the calculated complexity budget would allow processing at the highest complexity coding rate. In this case, the speech signal frame segment is processed based on the input speech in a manner similar to that described above in conjunction with block 306. Block 326 is then carried out.

At block 320, CRM 212 reduces the complexity coding rate used by SPU 212. For example, CRM 212 may signal SPU 212 to use the full rate (at 15 MIPS) rather than the half rate (at 25 MIPS). As described above, this less complex coding rate may be defined by CRM 212 to be used with just the present channel or for a group of channels.

At block 322, SPU 212 processes the speech signal frame segment in accordance with the complexity-reduced coding rate defined at block 320. As described above, speech encoder algorithms may be used in conjunction with CRM 212 to further optimize speech signal processing. Thus, there may be cases where the speech encoder algorithm selects a lower complexity coding rate to be used for the present channel (e.g., for inactive speech) than the coding rate defined by CRM 212 at block 320. In this case, the speech signal frame segment is processed with the lower complexity coding rate selected by the speech encoder algorithm. Where the speech encoder algorithm selects a higher complexity coding rate to be used for the present channel (e.g., for active speech) than the coding rate defined by CRM 212 at block 320, the coding rate defined by CRM 212 overrides the coding rate selected by the speech encoder algorithm, and SPU 216 processes the speech signal frame segment in accordance with the complexity-reduced rate defined by CRM 212 at block 320. Block 326 is then carried out.

At block 326, the time required to process the speech signal frame segment during block 322 or 324 is recorded in or otherwise cumulated to statistical data table 218. As described above, this time value represents process time consumed during the encoding operation of block 322 or 324.

At decision block 328, CRM 212 then determines whether there are any more channels to be processed by SPU 216 for the current cycle. If there are additional channels to process, block 310 is repeated as indicated by connection "C" 330. Otherwise, the next frame cycle is processed as described above and block 302 is then carried out as indicated by connection "D" 332.

Figure 4:
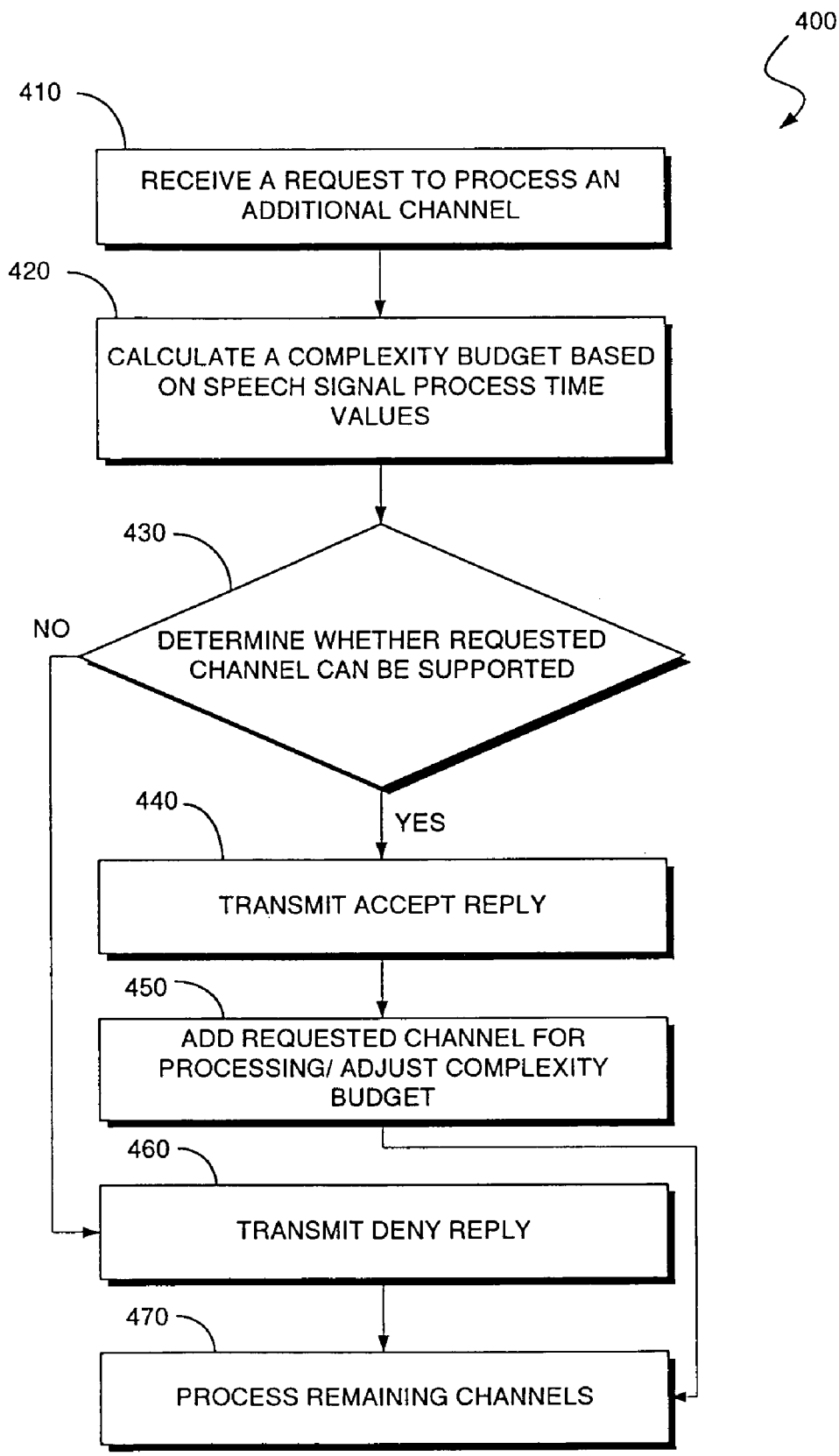
FIG. 4 depicts an illustrative flow diagram of a speech encoding method supporting variable communication channels in accordance with one embodiment.

Referring now to FIG. 4, an illustrative flow diagram 400 of a speech encoding method supporting variable communication channels in accordance with one embodiment is shown. In this embodiment, speech processor 208 is capable of interfacing with a variable or dynamic number of communication channels, and determines whether a requested channel may be supported based on a calculated complexity budget.

At block 410, speech processor 208 receives a request to manage a speech signal for a channel ("requested channel"). Speech processor 208 may or may not be managing other channels at this time.

At block 420, CRM 212 evaluates statistical data table 218 and calculates a complexity budget. As described above, one way to determine the remaining complexity budget would be to subtract the consumed process time from the available process time for the present cycle.

At decision block 430, CRM 212 then determines whether the requesting channel can be supported based on the calculated complexity budget determined during block 420. Various criteria may be used to define whether the requested channel may be supported including, for example, the impact on quality and/or bit rate for one or more of the currently accepted or active channels. In some embodiments, a pre-determined number of channels are supported. In this embodiment, CRM 212 will accept a channel if the pre-determined number of channels have not been exceeded (i.e., CRM 212 is currently managing fewer than the pre-determined number of channels). Otherwise, CRM 212 will reject the requested channel. In other embodiments, acceptance of a requested channel involves first determining whether SPU 216 is able to run without any complexity reduction (e.g., up to N channels). If so, CRM 212 does not operate, and any requested channel can be accepted until N channels have been accepted. For each requested channel above N channels, CRM 212 performs statistical complexity reduction analysis. For example, CRM 212 may determine the level of complexity reduction needed to accommodate the requested channel, and may accept/reject the requested channel based on whether a certain threshold of complexity reduction will be exceeded.

If the requested channel can be supported, block 440 is carried to transmit an "accept" reply and to process the speech signal from the requesting channel. Next at block 450, the requested channel is added for processing by the CRM 212 along with the other accepted channels. If necessary, the coding complexity of the remaining channels to be processed may be adjusted in accordance with the method described above in conjunction with FIG. 3. If the requested channel cannot be supported, block 460 is carried out to transmit a "deny" reply or other rejection signal. Block 470 is then carried out to process the remaining accepted or active channels. The process for encoding the active or accepted channels are carried out as described above in conjunction with FIG. 3.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A method for managing a processing time of a speech processor having at least one signal processing unit (SPU) configured to encode speech signals, the speech processor capable of interfacing with a plurality of communication channels, the speech processor having a time budget during which to process speech signals from each of the plurality of communication channels at least once, the method comprising:

receiving an input speech signal from one of the communication channels;

determining a total amount of time previously spent for processing one or more of the communication channels before the receiving the input speech signal from the one of the communication channels;

calculating a remaining time budget based on the total amount of time previously spent and the time budget; and signaling the SPU to change a present coding rate to a new coding rate based on the remaining time budget and a remaining number of communication channels of the plurality of communication channels to be processed;

wherein the SPU selects the new coding rate such that the speech processor is able to process speech signals from the remaining number of communication channels of the plurality of communication channels at least once during the remaining time budget.

2. The method of claim 1, wherein the SPU is further configured to encode the input speech signal using the new coding rate selected from a plurality of coding rates of a speech coder, and wherein at least two of the plurality of coding rates have different levels of complexity.

3. The method of claim 1, wherein the new coding rate is of lower complexity than the present coding rate.

4. A method for managing a processing time of a speech processor having at least one signal processing unit (SPU) configured to encode speech signals, the speech processor capable of interfacing with a variable number of a plurality of communication channels, the speech processor having a time budget during which to process speech signals from each of the plurality of communication channels at least once, the method comprising:

receiving a request to process speech signals from a new communication channel;

determining a total amount of time previously spent for processing one or more of the communication channels before the receiving the request to process speech signals from the new communication channel;

calculating a remaining time budget based on the total amount of time previously spent and the time budget; and accepting the request if the speech processor determines that the speech processor is able to process the new communication channel in addition to a remaining number of communication channels at least once during the remaining time budget.

5. The method of claim 4 further comprising: denying the request if the speech processor determines that the speech processor is not able to process the new communication channel in addition to the remaining number of communication channels at least once during the remaining time budget.

6. The method of claim 4 further comprising:

signaling the SPU to change a present coding rate to a new coding rate based on the remaining time budget, and new communication channel and the remaining number of communication channels of the plurality of communication channels to be processed;

wherein the SPU selects the new coding rate such that the speech processor is able to process speech signals from the new communication channel in addition to the remaining number of communication channels of the plurality of communication channels at least once during the remaining time budget.

7. A multi-channel speech processor configured to process speech signals from a plurality of communication channels within a time budget, the multi-channel speech processor comprising:

a controller capable of interfacing with the plurality of communication channels, wherein the controller is configured to receive an input speech signal from one of the communication channels, and further configured to determine a total amount of process time previously spent for processing one or more of the communication channels before receiving the input speech signal from the one of the communication channels;

a memory coupled to the controller configured to store process time values, wherein each of the process time values is indicative of an amount of time spent for processing input speech signals from one or more of the communication channels; and at least one signal processing unit (SPU) coupled to the memory and to the controller, the SPU configured to encode the speech signals;

wherein the controller calculates a remaining time budget based on the total amount of time previously spent and the time budget and wherein the controller signals the SPU to change a present coding rate to a new coding rate based on the remaining time budget and a remaining number of communication channels of the plurality of communication channels to be processed, and wherein the SPU selects the new coding rate such that the speech processor is able to process speech signals from the remaining number of communication channels of the plurality of communication channels at least once during the remaining time budget.

8. The multi-channel speech processor of claim 7, wherein the SPU is further configured to encode the input speech signal using the new coding rate selected from a plurality of coding rates of a speech coder, and wherein at least two of the plurality of coding rates have different levels of complexity.

9. The multi-channel speech processor of claim 7, wherein the new coding rate is of lower complexity than the present coding rate.

10. A multi-channel speech processor configured to process speech signals from a plurality of communication channels within a time budget, the multi-channel speech processor comprising:

a controller capable of interfacing with the plurality of communication channels, wherein the controller is configured to receive a request to process speech signals from a new communication channel, and further configured to determine a total amount of time previously spent for processing one or more of the communication channels before receiving the request to process speech signals from the new communication channel;

a memory coupled to the controller configured to store process time values, wherein each of the process time values is indicative of an amount of time spent for processing input speech signals from one or more of the communication channels; and at least one signal processing unit (SPU) coupled to the memory and to the controller, the SPU configured to encode the speech signals;

wherein the controller is configured to calculate a remaining time budget based on the total amount of time previously spent and the time budget, and wherein the controller accepts the request if the controller determines that the speech processor is able to process the new communication channel in addition to a remaining number of communication channels at least once during the remaining time budget.

11. The multi-channel speech processor of claim 10 wherein the controller denies the request if the controller determines that the speech processor is not able to process the new communication channel in addition to the remaining number of communication channels at least once during the remaining time budget.

12. The multi-channel speech processor of claim 10, wherein the controller signals the SPU to change a present coding rate to a new coding rate based on the remaining time budget, and new communication channel and the remaining number of communication channels of the plurality of communication channels to be processed, and wherein the SPU selects the new coding rate such that the speech processor is able to process speech signals from the new communication channel in addition to the remaining number of communication channels of the plurality of communication channels at least once during the remaining time budget.

* * * * *